US008886709B2

(12) United States Patent  
Klassen

(10) Patent No.: US 8,886,709 B2
(45) Date of Patent: Nov. 11, 2014

(54) SYSTEM AND METHOD FOR EFFICIENT IMAGE AND DOCUMENT UPLOAD

(75) Inventor: Gerhard Dietrich Klassen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 862 days.

(21) Appl. No.: 12/785,260

(22) Filed: May 21, 2010

(65) Prior Publication Data

US 2011/0289136 A1    Nov. 24, 2011

(51) Int. Cl.
| | |
|---|---|
| *G06F 15/16* | (2006.01) |
| *G06F 17/00* | (2006.01) |
| *H04L 29/08* | (2006.01) |
| *H04N 1/32* | (2006.01) |
| *H04N 1/333* | (2006.01) |
| *H04N 1/00* | (2006.01) |

(52) U.S. Cl.
CPC ...... *H04N 1/32101* (2013.01); *H04N 2201/218* (2013.01); *H04N 2201/325* (2013.01); *H04N 2201/33328* (2013.01); *H04N 2201/3222* (2013.01); *H04N 1/33353* (2013.01); *H04N 1/00307* (2013.01); *H04N 2201/3274* (2013.01); *H04N 1/33315* (2013.01); *H04N 2201/0084* (2013.01)
USPC .......................... 709/203; 715/229; 455/414.4

(58) Field of Classification Search
None
See application file for complete search history.

(56) References Cited

U.S. PATENT DOCUMENTS

| | | | |
|---|---|---|---|
| 6,832,102 B2 | 12/2004 | I'Anson | |
| 7,068,309 B2 | 6/2006 | Toyama et al. | |
| 7,165,224 B2 | 1/2007 | Pyhalammi | |
| 7,299,423 B2 | 11/2007 | Watanabe et al. | |
| 7,363,258 B2 | 4/2008 | Svendsen et al. | |
| 7,460,151 B2 | 12/2008 | Minatogawa | |
| 2004/0172451 A1 | 9/2004 | Biggs et al. | |
| 2007/0035764 A1 | 2/2007 | Aldrich et al. | |
| 2008/0032739 A1* | 2/2008 | Hoodbhoy et al. | 455/556.2 |
| 2009/0164606 A1* | 6/2009 | Epifania et al. | 709/219 |
| 2010/0094930 A1* | 4/2010 | Griff et al. | 709/203 |
| 2010/0201845 A1* | 8/2010 | Feinberg et al. | 348/231.99 |
| 2010/0235425 A1* | 9/2010 | Holden et al. | 709/202 |
| 2010/0255830 A1* | 10/2010 | Manolescu et al. | 455/418 |

OTHER PUBLICATIONS

Corcoran, P.M., et al., "Wireless transfer of images from a digital camera to the Internet via a standard GSM mobile phone" IEEE Transactions on Consumer Electronics, vol. 47, Aug. 3, 2001, pp. 542-547, http://ieeexplore.ieee.org/xpl/freeabs_all.jsp?arnumber=964144, accessed Oct. 8, 2010.
GloMop Group, "GloMop: Global Mobile Computing by Proxy", Sep. 13, 1995, pp. 1-12.

\* cited by examiner

*Primary Examiner* — Ranodhi Serrao
(74) *Attorney, Agent, or Firm* — Jenna L. Wilson; Dimock Stratton LLP

(57) ABSTRACT

There is disclosed a system and method for uploading a document from the device to a server. In an embodiment, the method comprises: (i) generating and storing a scaled down version of the document on the device; (ii) determining the type of connection the device has established with the server; (iii) if the device has established a specified type of high bandwidth connection to the server, then: uploading the document from the device to the server; deleting the document from the device; and creating an upload record of data associated with the scaled down version of the document on the device to subsequently access the uploaded document; (iv) else, if the device has not established a specified type of high bandwidth connection to the server, then uploading the scaled down version of the document.

20 Claims, 7 Drawing Sheets

SYSTEM AND METHOD FOR EFFICIENT IMAGE AND DOCUMENT UPLOAD

The present disclosure relates generally to systems and methods for uploading image files and other types of large documents from a mobile communication device.

BACKGROUND

With continuous improvement in equipment and features, mobile communication devices are now being used for more multi-media applications, including imaging, video, and audio. Often, it is desirable to be able to share photos and other types of documents with others, requiring that the files be uploaded from the mobile communication device. With limited bandwidth or other resource limitations, what is needed is an improved system and method for uploading photos and other types of large documents.

DETAILED DESCRIPTION

As noted above, the present disclosure relates generally to a system and method for uploading photos and documents from a wireless handheld device.

Figure 1:
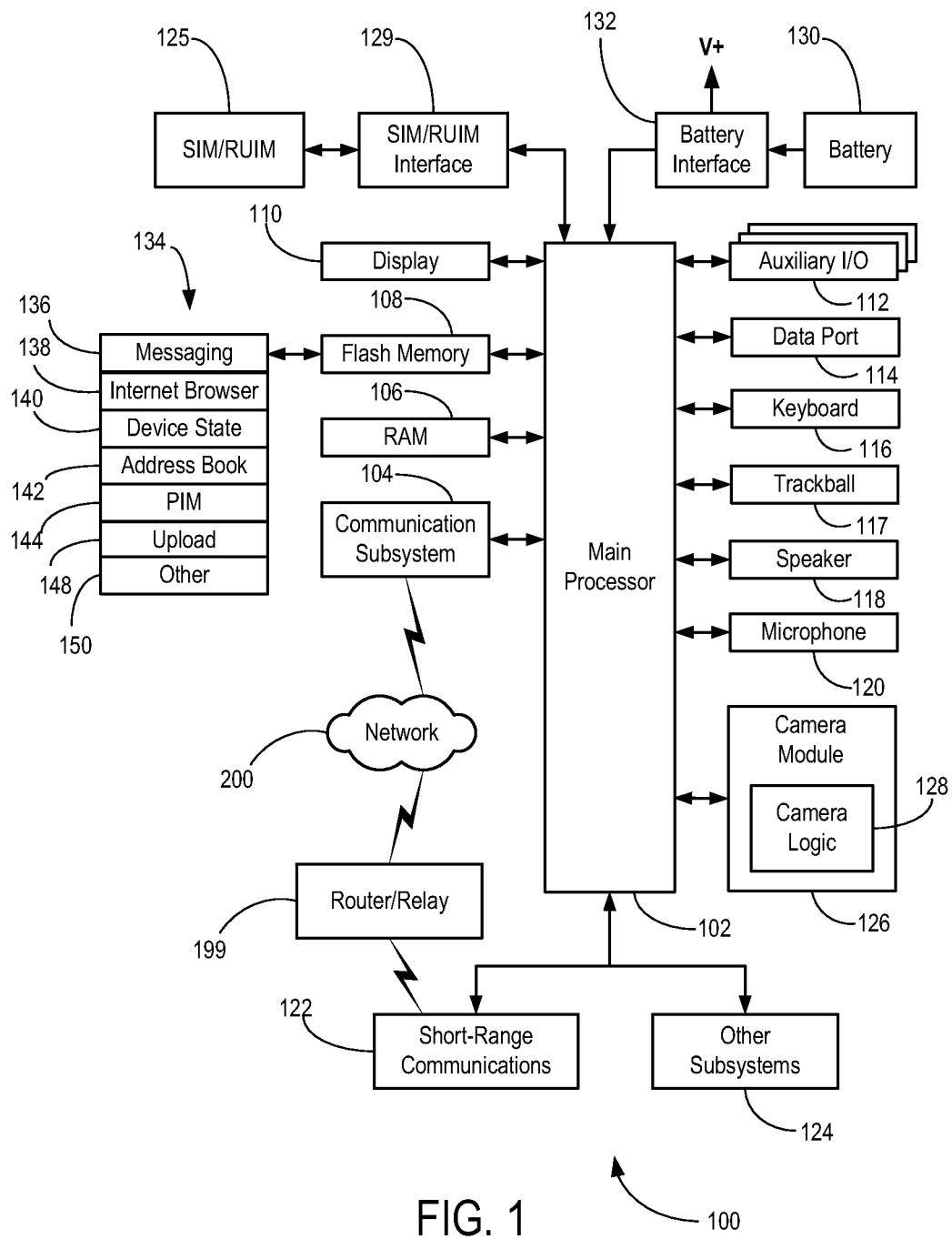
FIG. 1 is a schematic block diagram of various components that may be found in a handheld mobile communication device.

In an illustrative embodiment, the invention may be practiced with a handheld mobile communication device in a wireless operating environment. Shown in FIG. 1 is a schematic block diagram of an illustrative handheld mobile communication device 100. The communication device 100 may comprise a number of components, including a main processor 102 which controls the overall operation of communication device 100. The main processor 102 may also interact with additional subsystems such as a random access memory (RAM) 106, a flash memory 108, a display 110, an auxiliary input/output (I/O) subsystem 112, a data port 114, a keyboard 116, a navigator 117, a speaker 118, a microphone 120, short-range communications 122, a GPS subsystem 124, a camera module 126, and associated camera logic 128.

Communication functions, including data and voice communications, may be performed through communication subsystem 104. The communication subsystem 104 may be adapted for cellular wireless communications and receive data from and send messages to a wireless network 200 in accordance with various network protocols. Such protocols may include, but are not limited to, one or more of the Global System for Mobile communication (GSM), Enhanced Data GSM Environment (EDGE), General Packet Radio Services (GPRS), Universal Mobile Telecommunications Service (UMTS), Code Division Multiple Access (CDMA), Time Division Multiple Access (TDMA), Integrated Digital Enhanced Network (iDEN), Mobitex, and DataTAC protocols.

In addition to cellular wireless communication functions performed via communication subsystem 104, communication device 100 may also perform short-range communications through short-range communication module 122. For example, communication device 100 may access network 200 via a wireless router 199 providing an IEEE 802.11 (e.g. 802.11b/g/n) Wi-Fi hot spot within a local area and connected to network 200. Short-range communication module 122 may also support other types of connections such as Bluetooth for communication within a more limited area such as a room, or active near-field communications ("NFC") performed over even shorter distances of a few inches or centimeters. An illustrative NFC is standardized in ECMA-340 and ISO/IEC 18092, for example.

In an embodiment, data port 114 may provide communication device with a wired connection for communication, for example, with a personal computer (not shown). As an illustrative example, data port 114 may be a universal serial bus ("USB") type connector (as specified by the USB Implementers Forum, Inc.), allowing communication device 100 to be connected via a USB cable to a USB input port on a personal computer. As another illustrative example, data port 114 may support IEEE 1394 (also known as FireWire, i.Link, Lynx) high-speed serial bus communications.

Other subsystems of communication device 100 perform "resident" or on-device functions. By way of example, the display 110 and the keyboard 116 may be used for both communication-related functions, such as entering a text message for transmission over the network 200, and device-resident functions such as a calculator or task list. The navigator 117 (e.g. a joystick, trackball or an optical tracker) may be used for various navigation functions, such as navigating through a graphical user interface (GUI) menu displayed on display 110. The navigator 117 may also be configured with a secondary actuation feature, such as allowing a user to depress the navigator, to allow selection of a highlighted item. Display 110 may also be a touch screen, allowing selection of displayed objects or menu items by touch.

Still referring to FIG. 1, operating system software used by the main processor 102 is typically stored in a persistent store such as flash memory 108. A suitable file system may store the operating system software as well as device application files and data in hierarchical files and folders. Those skilled in the art will appreciate that the operating system, specific device applications, or parts thereof, may also be temporarily loaded into a volatile store, such as the RAM 106, for processing by main processor 102.

The communication device 100 may send and receive communication signals over the wireless network 200 after required network registration or activation procedures have been completed, and network access may be associated with a subscriber or user of the communication device 100.

To identify a user, the communications device 100 may use a SIM/RUIM/USIM card 125 (i.e. Subscriber Identity Module or a Removable User Identity Module or a Universal Subscriber Identity Module, etc.), which is inserted into a SIM/RUIM/USIM interface 129, to communicate with a network. The SIM/RUIM/USIM card 125 is one type of a conventional "smart card" that can be used to identify a user of the communications device 100 and to personalize the communications device 100, among other things.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. The battery 130 may be used to power all components and modules in the communication device 100.

The main processor 102, in addition to its operating system functions, enables execution of various software applications 134 on the communication device 100. A subset of software applications 134 that control basic device operations, including data and voice communication applications, will normally be installed on the communication device 100 during its manufacture.

The software applications 134 may include a messaging application 136. The messaging application 136 can be any suitable software program that allows a subscriber or user of the communication device 100 to send and receive wireless text communications. Messages that have been sent or received by the user are typically stored in local storage such as flash memory 108 of the communication device 100, or in some other suitable storage element in the communication device 100. In an alternative embodiment, some of the sent and received messages may be stored remotely from the communication device 100 such as in a data store of an associated host system that the communication device 100 communicates with.

The communication device 100 may also include an Internet browser module 138, for wirelessly accessing the Internet from the device 100. The communication device 100 may further include a device state module 140, an address book 142, a personal information manager (PIM) 144, and various other modules 150. Additional software applications may also be loaded onto the communication device 100 through at least one of the wireless network 200, the auxiliary I/O subsystem 112, the data port 114, the short-range communications subsystem 122, or other device subsystem 124.

The communication device 100 may further include an upload module 148 for uploading various photos and documents in accordance with an embodiment. Upload module 148 will be described in more detail further below.

Figure 2:
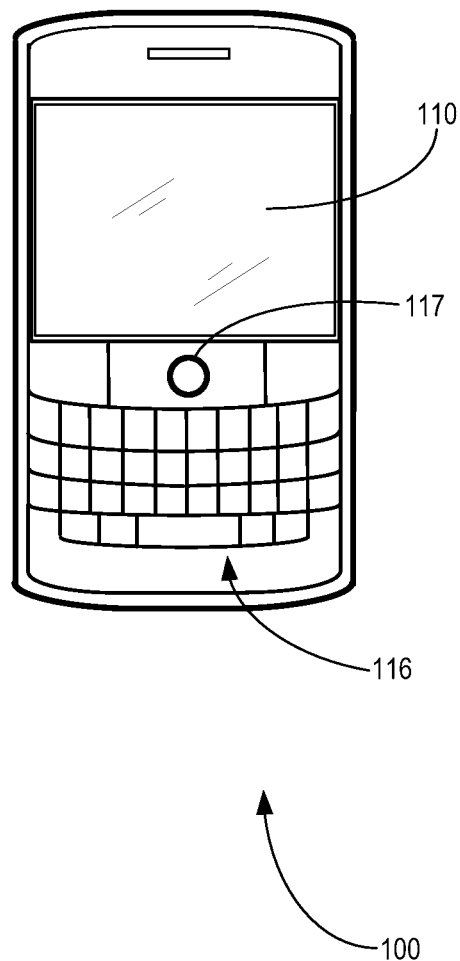
FIG. 2 is an illustrative example of a handheld mobile communication device which may provide an operating environment.

Now referring to FIG. 2, shown is an illustrative front view of a handheld mobile communication device 100 that may provide a suitable operating environment. As shown, the communication device 100 may include a display 110, a keyboard 116, and other input or navigation means such as a navigator 117. The display 110 may be configured to display various screens allowing the user of device 100 to view screen outputs from the various software applications 134, including the presentation module 149. In an embodiment, display 110 may be configured to provide a touch-sensitive screen input in response to a prompt or query displayed on display 110.

Figure 3:
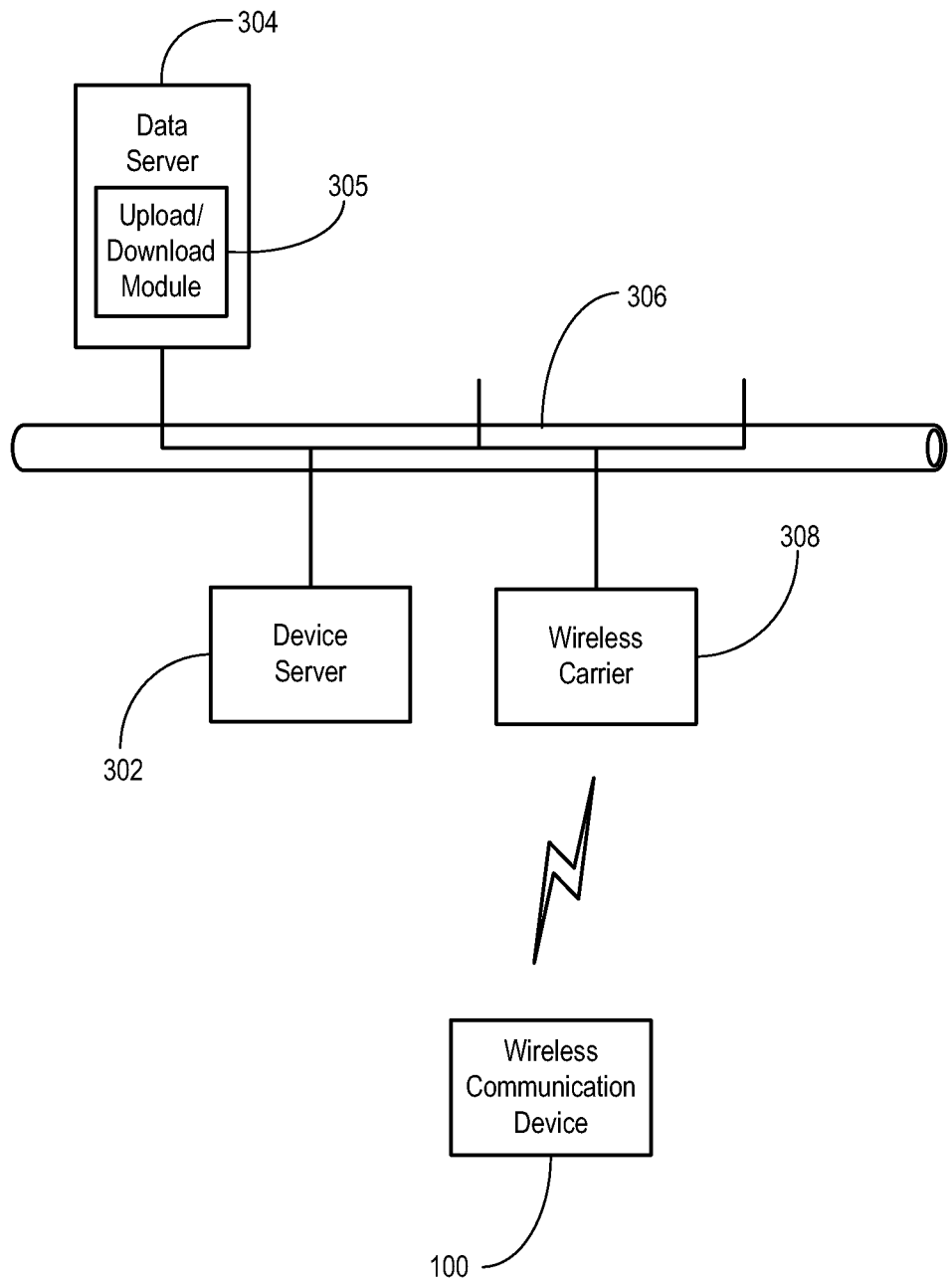
FIG. 3 is a schematic block diagram of an illustrative network which may provide a suitable operating environment.

Now referring to FIG. 3, shown is a schematic block diagram of an illustrative network 300 which may provide a suitable operating environment. As shown, wireless communication device 100 may be wirelessly connected into network 306 via wireless carrier 308. Network 306 may also connect a device server 302 that may host various functions for communication device 100, and data server 304 that may store various types of data that may be downloaded to communication device 100 or uploaded from wireless communication device 100. For example, data server 304 may store images, messages, and other types of documents. As shown, data server 304 may include a suitably configured upload/download module 305 for facilitating the data upload from communication device 100, or data download to communication device 100.

In an embodiment, data server 304 may be a shared Internet data server storing data uploaded by various wireless communication devices. For example, data server 304 may be an Internet blog to which photos, messages, text and documents may be uploaded. Data server 304 and upload/download module 305 will be described in more detail further below.

Figure 4:
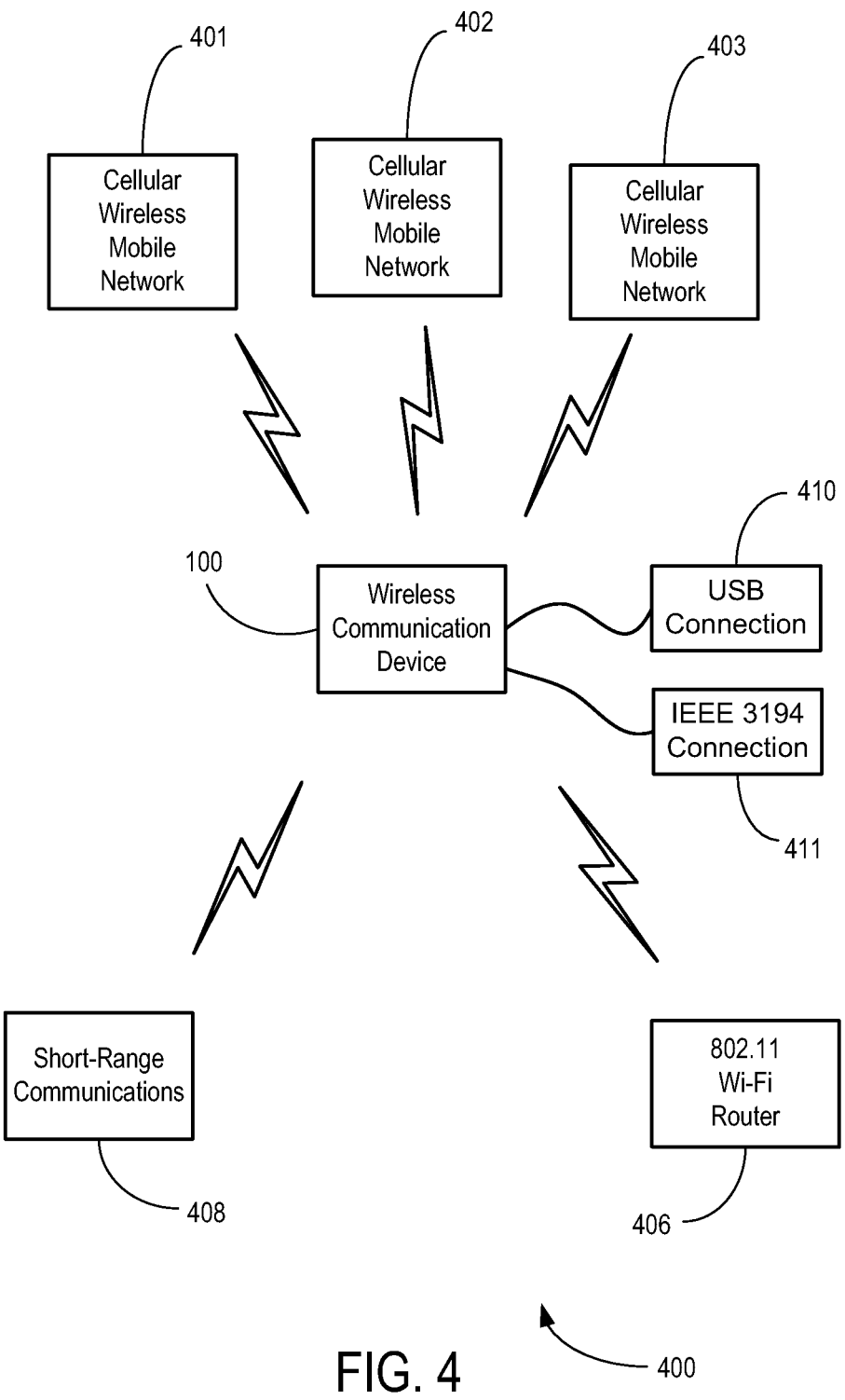
FIG. 4 is a schematic block diagram of various types of wireless and wired connections available for a wireless communication device.

Now referring to FIG. 4, shown is a schematic block diagram of an illustrative wireless communications device 100 that may have access to various types of wireless communications. In an illustrative example, wireless communications device 100 may be configured to be capable of communicating with one or more wireless networks such as cellular wireless mobile networks 401, 402 or 403. Wireless communications device 100 may also be configured to be capable of communicating with 802.11 Wi-Fi router 406 and other short-range or near-field communications via short-range communications module 408. As well, wireless communications device 100 may be configured to be connected via wire to a USB connection 410 or to an IEEE 3194 connection 411, for example.

While device 100 may be configured to be capable of accessing various types of wireless communications and wired connections as described above, actual ability to access any of these types of wireless communications will depend on availability of the wireless communication networks, and whether communication device 100 is currently within operating range for communications. Various other factors will come into play, such as whether the communication device 100 is currently located in an underground parking lot, such that the signal from a cellular wireless mobile network is lost. Alternatively, communication device 100 may be temporarily located outside of a coverage area, such that access to a high-speed wireless digital mobile network (e.g. EDGE, 3G, 4G) is not available.

Given the possibility that a wireless network may be available to communication device 100, but that the highest speed network that the communication device 100 is configured to access may not be currently available at a particular time or particular location, it is desirable to be able to manage uploads from and downloads to communication device 100 such that available wireless network resources are utilized effectively.

As an illustrative example, suppose that communication device 100 provides users with the opportunity to post documents and photos to an Internet blog or server (e.g. to data server 304 of FIG. 3, above). With current models of communication devices 100 offering cameras with higher resolution sensors (e.g. 2.0 MP, 3.2 MP or even higher), a potential problem is that some image files can be very large. Even with relatively high-speed networks available, uploading such documents from the communication device can be resource intensive.

Nevertheless, as a part of the attraction of some Internet blogs is to see posted images, text and other documents shortly after an event, a user might like to post images as soon as they are taken on the communication device 100. Uploading a full size image could take a long time, consume a lot of bandwidth, and may be expensive if the communication device 100 is on a capped or metered data usage plan, is currently not in a suitable wireless coverage area, or is currently roaming in a foreign jurisdiction with applicable high roaming fees and rates.

As a potential solution, whenever communication device 100 is not in an appropriate wireless coverage area, or otherwise wired to a personal computer using suitable cables, upload module 148 may be configured to utilize a rules set to upload a generated scaled down version of the image file with lower quality settings for posting to the Internet blog or data server 304. For example, a thumbnail sized version of the image which is a fraction of the size of the original can be automatically generated on communication device 100 when the image is taken (e.g. using camera module 126 and camera logic 128), and this lower quality version of the image can be uploaded to data server 304 in much less time, and with much less data than the full version. However, while a thumbnail size image may be appropriate for short term posting, it may be desirable to post the full size image on the blog for viewing on a long term basis.

In order to address this problem, what is proposed is to track the uploading of the thumbnail image to the blog or data server 304, and to store this information on the communication device 100 such that the thumbnail image initially uploaded to the data server 304 may be replaced by a larger sized image or the original sized image stored on the communication device 100 as soon as the communication device 100 has access to a less expensive communication means, such as for example a wired USB or IEEE 3194 connection, or a wireless Bluetooth or 802.11 Wi-Fi router connection. Alternatively, access to a high-speed 3G or 4G cellular wireless network within the communication device 100's home jurisdiction may also be a suitable communication means if the communication device 100 is on a high-capacity or unlimited data plan.

Figure 5:
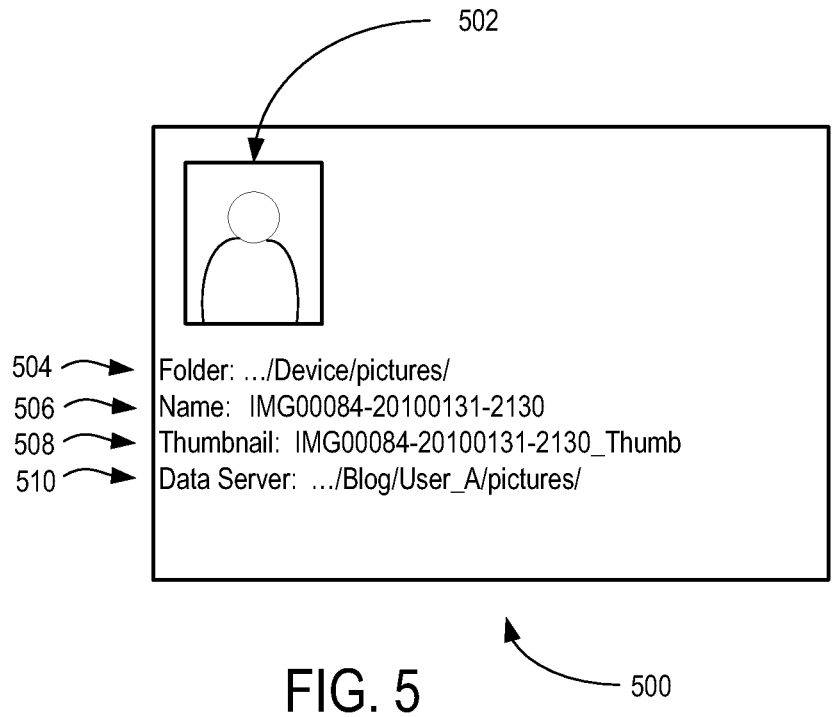
FIG. 5 is an illustrative example of an image upload record containing data associated with an image upload.

This proposed solution allows the communication device 100 to upload a thumbnail version of an image almost immediately, and to upload a larger version or the original version of the image as soon as the communication device 100 can upload the larger version or original version cost effectively. In order to do this, however, the communication device 100 must retain information about the uploaded thumbnail image and its destination. As an illustrative example, as shown in FIG. 5, the thumbnail upload information could be retained on communication device 100 in an upload file record 500. In an embodiment, this upload file record may include a thumbnail version of the image 502, the folder 504 in which the original image is stored on communication device 100 (e.g. a folder in flash memory 108), the name of the image 506, the name of the thumbnail version of the image 508, and a unique Internet URL associated with the uploaded thumbnail image file (e.g. on data server 304).

In an embodiment, upload module 148 may be configured to save the information including the name of the image 506, the name of the thumbnail version of the image 508, and the Internet URL information in an upload file record 500 for each uploaded image, and to store this upload file record 500 for later use. For example, the upload file record 500 may be used to subsequently recall and download a higher resolution version or the original version of the image at any time. Also, the information stored in upload file record 500 may be forwarded to another user so that the thumbnail version, larger version or original version can be accessed and downloaded by the other user at any time after upload.

Figure 6:
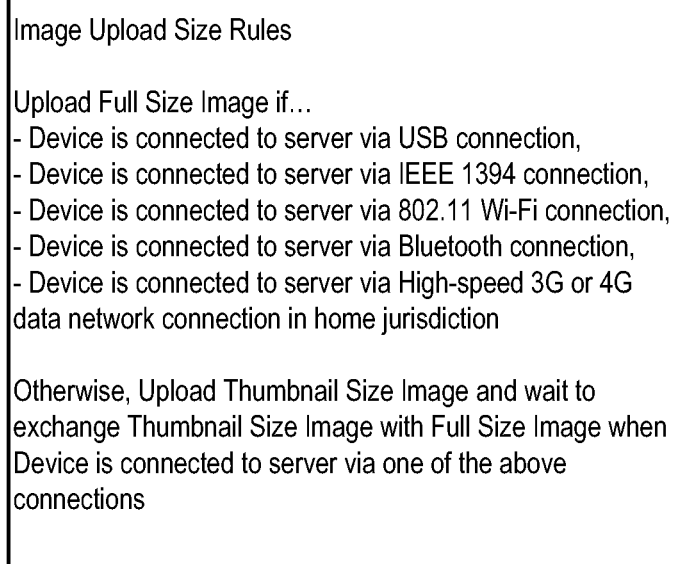
FIG. 6 is an illustrative rule set for uploading images from a wireless communication device.

Now referring to FIG. 6, shown is an illustrative example of a rules set for uploading an image. As shown, the rules may comprise uploading a full size image if the device is connected to the server via any one of a USB cable, IEEE 1394 cable, 802.11 Wi-Fi, or Bluetooth connection. In an embodiment, high-speed 3G and 4G data network connections in a home jurisdiction for communication device 100 may also be appropriate. However, as "cost effective" may be dependent upon how much value a user places on uploading a particular image to a blog, a user may wish to change the rules such that the full size image is uploaded under fewer conditions, or perhaps uploaded under more conditions. Based on this rules set, a thumbnail image uploaded to a data server may be automatically updated when the wireless communication device 100 comes within range of one of the specified types of connections enabling upload of a larger size or original size image.

Figure 7A:
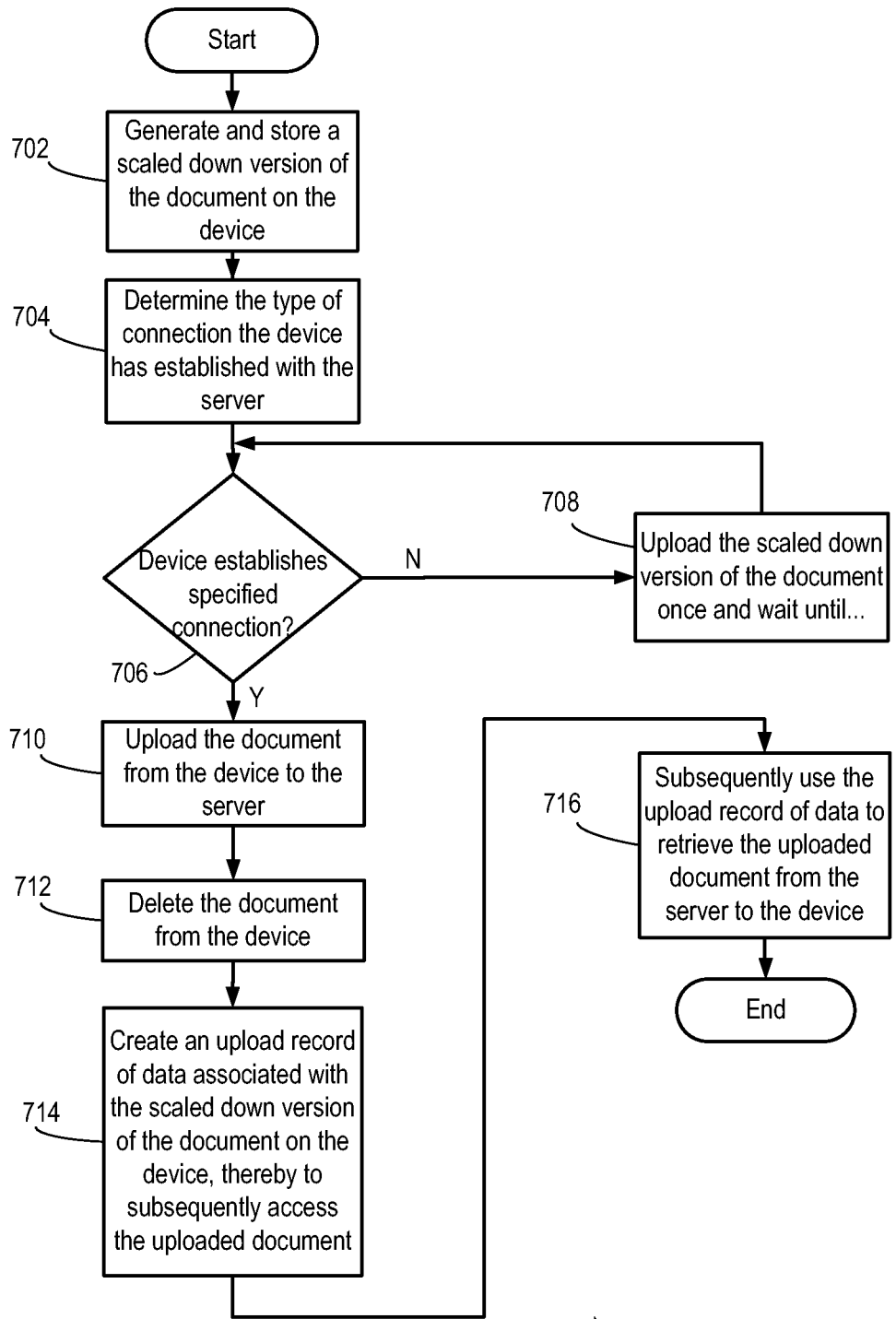
FIG. 7A and FIG. 7B are a schematic flow-chart of a method in accordance with an embodiment.

Now referring to FIG. 7, shown is an illustrative method 700 in accordance with an embodiment. As shown, method 700 may begin at block 702, where method 700 generates and stores a scaled down version of the document on the device. The scaled down version of the document may be a thumbnail image or a somewhat larger image appropriate for the size of the display 110 (FIGS. 1 and 2) which permits browsing on the wireless communication device 100.

Method 700 then proceeds to block 704, where method 700 generates and stores a scaled down version of the document on the device. Method 700 then proceeds to block 204, where method 700 determines the type of connection the device has established with the server.

Method 700 then proceeds to decision block 706, where method 700 determines if the devices has established the specified type of high speed connection to the device. If yes, method 700 proceeds to block 710.

At block 710, method 700 uploads the document from the device to the server. Method 700 then proceeds to block 712, where method 700 deletes the document from the device. Method 700 then proceeds to block 714, where method 700 creates an upload record of data associated with the scaled down version of the document on the device, thereby to subsequently access the uploaded document from the device.

Referring back to decision block 706, if no, method 700 proceeds to block 708, where method 700 uploads the scaled down version of the document, and waits or loops at decision block 706 until the device has established a specified type of connection to perform the steps at blocks a710, 712 and 714.

From block 714, method 700 proceeds to block 716, where method 700, where method 700 subsequently uses the upload record of data to access and retrieve the uploaded document from the server to the device. This may be useful, for example, when the user wants to view a close up of a part of the document, in which case retrieving the uploaded document from the server to the device will provide the additional details necessary for viewing the close up.

The upload record of data may also be transmitted to other users, so that those other users can access the uploaded document from their respective devices. As the other users never had the original document on their devices, they may now also view the high quality original document.

Figure 7B:
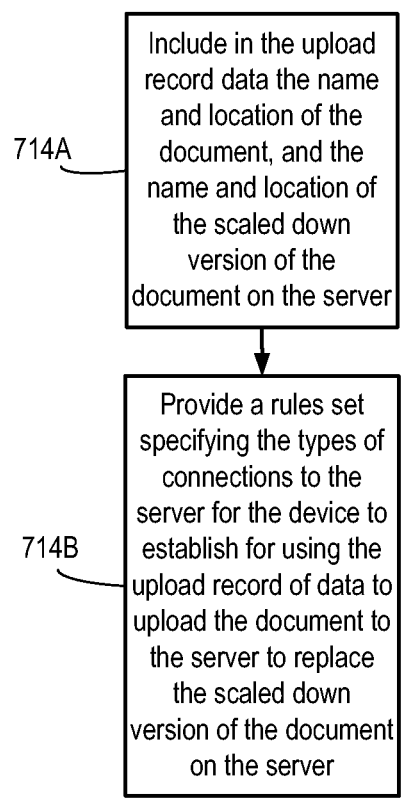

Now referring to FIG. 7B, in an embodiment, as shown, block 714 of method 700 may include a number of sub-steps, including step 714A where method 700 includes in the upload record data the name and location of the document, and the name and location of the scaled down version of the document on the server.

Block 714 of method 700 may further include block 714B, where method 700 provides a rules set specifying the types of connections to the server that are acceptable. The types of connections may include, for example, one or more of a USB connection, an IEEE 1394 connection, an 802.11 Wi-Fi connection, a Bluetooth connection, and a high-speed 3G/4G data network connection in a home jurisdiction for the device.

Thus, in an aspect, there is provided a method operable on a mobile communications device for uploading a document from the device to a server, comprising: (i) generating and storing a scaled down version of the document on the device; (ii) determining the type of connection the device has established with the server; (iii) if the device has established a specified type of high bandwidth connection to the server, then uploading the document from the device to the server, deleting the document from the device, and creating an upload record of data associated with the scaled down version of the document on the device, thereby to subsequently access the uploaded document; (iv) else, if the device has not established a specified type of connection to the server, then uploading the scaled down version of the document and waiting until a specified type of connection is established.

In an embodiment, the method further comprises performing step (iii) as soon as the device has established a specified type of connection to the server.

In another embodiment, the method further comprises subsequently using the upload record of data to retrieve the uploaded document from the server to the device.

In another embodiment, the document is an image file, and generating a scaled down version of the document comprises generating a thumbnail version of the image file.

In another embodiment, the upload record data includes the name and location of the scaled down version of the document on the device, and the name and location of the document on the server.

In another embodiment, the method further comprises providing a rules set specifying the types of connections to the server.

In another embodiment, the types of connections includes one or more of a USB connection, an IEEE 1394 connection, an 802.11 Wi-Fi connection, a Bluetooth connection, and a high-speed 3G/4G data network connection in a home jurisdiction for the device.

In another aspect, there is provided a system on a mobile communications device for uploading a document from the device to a server, wherein the system is adapted to: generate and store a scaled down version of the document on the device; determine the type of connection the device has established with the server; if the device has established a specified type of high bandwidth connection to the server, then upload the document from the device to the server, delete the document from the device, and create an upload record of data associated with the scaled down version of the document on the device to subsequently access the uploaded document; else, if the device has not established a specified type of connection to the server, then upload the scaled down version of the document and wait until a specified type of connection is established.

In an embodiment, the system is further adapted to upload the document from the device to the server, delete the document from the device, and create the upload record of data associated with the scaled down version of the document on the device as soon as the device has established a specified type of connection to the server.

In another embodiment, the system is further adapted to subsequently use the upload record of data to retrieve the uploaded document from the server to the device.

In another embodiment, the document is an image file, and the system is further adapted to generate a scaled down version of the document comprises generating a thumbnail version of the image file.

In another embodiment, the upload record data includes the name and location of the scaled down version of the document on the device, and the name and location of the document on the server.

In another embodiment, the system is further adapted to provide a rules set specifying the types of connections to the server.

In another embodiment, the types of connections includes one or more of a USB connection, an IEEE 1394 connection, an 802.11 Wi-Fi connection, a Bluetooth connection, and a high-speed 3G/4G data network connection in a home jurisdiction for the device.

In another aspect, there is provided a data processor readable medium storing data processor code that when loaded into a mobile communications device adapts the device for uploading a document from the device to a server, the data processor medium comprising: code for generating and storing a scaled down version of the document on the device; code for determining the type of connection the device has established with the server; code for if the device has established a specified type of high bandwidth connection to the server, then uploading the document from the device to the server; deleting the document from the device; and creating an upload record of data associated with the scaled down version of the document on the device to subsequently access the uploaded document; else, code for if the device has not established a specified type of connection to the server, then uploading the scaled down version of the document and waiting until a specified type of connection is established.

In an embodiment, the data processor readable medium further comprises code for uploading the document from the device to the server, deleting the document from the device, and creating an upload record of data associated with the scaled down version of the document on the device as soon as the device has established a specified type of connection to the server.

In another embodiment, the data processor readable medium further comprises code for subsequently using the upload record of data to retrieve the uploaded document from the server to the device.

In another embodiment, the document is an image file, and generating a scaled down version of the document comprises generating a thumbnail version of the image file.

In another embodiment, the upload record data includes the name and location of the scaled down version of the document on the device, and the name and location of the document on the server.

In another embodiment, the data processor readable medium further comprises code for providing a rules set specifying the types of connections to the server.

In another embodiment, the types of connections includes one or more of a USB connection, an IEEE 1394 connection, an 802.11 Wi-Fi connection, a Bluetooth connection, and a high-speed 3G/4G data network connection in a home jurisdiction for the device.

While illustrative embodiments have been described above, it will be appreciated that various changes and modifications may be made. More generally, the scope of the invention is defined by the following claims.

What is claimed is:

1. A method operable on a mobile communication device for uploading a document from the mobile communication device to a server, comprising:
    generating and storing a scaled down version of the document on the mobile communication device;
    determining the type of connection the mobile communication device has established with the server;
    when the mobile communication device has established a connection to the server other than a specified type of high bandwidth connection, uploading the scaled down version of the document to the server;

when the mobile communication device has established the specified type of high bandwidth connection to the server:
   uploading the document from the mobile communication device to the server;
   deleting the document from the mobile communication device; and
   storing a record of the upload associated with the scaled down version of the document on the mobile communication device; and
after the document has been uploaded to the server, subsequently retrieving the uploaded document from the server using the stored record, and storing the retrieved document on the mobile communication device.

2. The method of claim 1, further comprising, after uploading the scaled down version of the document, upon detection that the mobile communication device has established the specified type of connection to the server:
   uploading the document from the mobile communication device to the server;
   deleting the document from the mobile communication device; and
   storing the record of the upload associated with the scaled down version of the document on the mobile communication device.

3. The method of claim 1, wherein the document is an image file, and generating a scaled down version of the document comprises generating a thumbnail version of the image file.

4. The method of claim 1, wherein the stored record comprises an identifier for the scaled down version of the document on the mobile communication device, and an identifier and address of the uploaded document on the server.

5. The method of claim 4, wherein the stored record further comprises the scaled down version of the document.

6. The method of claim 1, further comprising providing a rules set specifying the types of connections to the server.

7. The method of claim 6, wherein the types of connections include one or more of a USB connection, an IEEE 1394 connection, an 802.11 Wi-Fi connection, a Bluetooth connection, and a high-speed 3G/4G data network connection in a home jurisdiction for the device.

8. The method of claim 1, wherein the specified type of connection comprises a connection to a wireless network within a home jurisdiction of the mobile communication device.

9. The method of claim 1, further comprising transmitting the stored record to a further mobile communication device.

10. The method of claim 9, further comprising the further mobile communication device:
   retrieving the uploaded document from the server using the transmitted record; and
   storing the retrieved document.

11. A mobile communication device, including:
   at least one memory;
   a plurality of communication modules; and
   a processor in communication with the at least one memory and the plurality of communication modules, the processor being configured to, using the at least one memory and the plurality of communication modules:
      generate and store a scaled down version of a document on the mobile communication device;
      determine the type of connection the mobile communication device has established with the server;
      when the mobile communication device has established a connection to the server other than a specified type of high bandwidth connection, upload the scaled down version of the document to the server;
      when the mobile communication device has established the specified type of high bandwidth connection to the server:
         upload the document from the mobile communication device to the server;
         delete the document from the mobile communication device; and
         store a record of the upload associated with the scaled down version of the document on the mobile communication device; and
      after the document has been uploaded to the server, subsequently retrieve the uploaded document from the server using the stored record, and store the retrieved document on the mobile communication device.

12. The mobile communication device of claim 11, wherein the processor is further configured to, after uploading the scaled down version of the document, upon detection that the mobile communication device has established the specified type of connection to the server:
   upload the document from the mobile communication device to the server;
   delete the document from the mobile communication device; and
   store the record of the upload associated with the scaled down version of the document on the mobile communication device.

13. The mobile communication device of claim 11, wherein the document is an image file, and generating a scaled down version of the document comprises generating a thumbnail version of the image file.

14. The mobile communication device of claim 11, wherein the stored record comprises an identifier for and the scaled down version of the document on the mobile communication device, and an identifier and address of the uploaded document on the server.

15. The mobile communication device of claim 14, wherein the stored record further comprises the scaled down version of the document.

16. The mobile communication device of claim 11, wherein the processor is further configured to provide a rules set specifying the types of connections to the server.

17. The mobile communication device of claim 16, wherein the types of connections include one or more of a USB connection, an IEEE 1394 connection, an 802.11 Wi-Fi connection, a Bluetooth connection, and a high-speed 3G/4G data network connection in a home jurisdiction for the device.

18. The mobile communication device of claim 11, wherein the specified type of connection comprises a connection to a wireless network within a home jurisdiction of the mobile communication device.

19. The mobile communication device of claim 11, wherein the processor is further configured to transmit the stored record to a further mobile communication device.

20. A non-transitory data processor readable medium storing data processor code that when executed by a mobile communication device, causes the device to implement a method comprising:
   generating and storing a scaled down version of a document on the mobile communication device;
   determining the type of connection the mobile communication device has established with a server;
   when the mobile communication device has established a connection to the server other than a specified type of high bandwidth connection, uploading the scaled down version of the document to the server;

when the mobile communication device has established the specified type of high bandwidth connection to the server:

uploading the document from the mobile communication device to the server;

deleting the document from the mobile communication device; and storing a record of the upload associated with the scaled down version of the document on the mobile communication device; and after the document has been uploaded to the server, subsequently retrieving the uploaded document from the server using the stored record and storing the retrieved document on the mobile communication device.

\* \* \* \* \*